Aug. 8, 1950       E. R. GERBER       2,518,302
COMBINATION CORN PICKER AND SHELLER

Filed Nov. 8, 1947       4 Sheets-Sheet 1

INVENTOR.
Edward R. Gerber

Aug. 8, 1950　　　　　　E. R. GERBER　　　　　　2,518,302
COMBINATION CORN PICKER AND SHELLER
Filed Nov. 8, 1947　　　　　　　　　　　　　4 Sheets-Sheet 4

INVENTOR.
Edward R. Gerber
BY Paul O. Pippel
Atty.

Patented Aug. 8, 1950

2,518,302

UNITED STATES PATENT OFFICE 2,518,302

COMBINATION CORN PICKER AND SHELLER

Edward R. Gerber, Stockton, Calif., assignor to International Harvester Company, a corporation of New Jersey Application November 8, 1947, Serial No. 784,910

8 Claims. (Cl. 56—18)

This invention relates to a new and improved combination corn picker and sheller.

An important object of this invention is to provide a corn sheller mechanism associated with a pair of spaced corn picking units which individually snap the ears of corn and feed them to axially aligned shelling rotors and further providing for common separating, cleaning and elevating mechanism for the shelled corn.

Another and further important object of this invention is to provide a two-row tractor-mounted corn picker in which spaced corn picking units deliver severed stalks of corn upwardly and rearwardly and thence substantially horizontally through snapping means causing the ears to fall forwardly into opposed auger feed means on the outer ends of axially aligned shelling cylinders to effect a central delivery of the snapped ears of corn being shelled to a husk and cob shaking device, all positioned between the spaced snapping units and means adapted to elevate the shelled corn upwardly and rearwardly to a trailing wagon.

Another and further important object of this invention is to provide a simple and compact combined corn picker and sheller incorporating many grain saving features which contribute to efficient corn picking and shelling.

Other and further important objects of this invention will become apparent from the disclosures in the following specification and accompanying drawings, in which.

Figure 1:
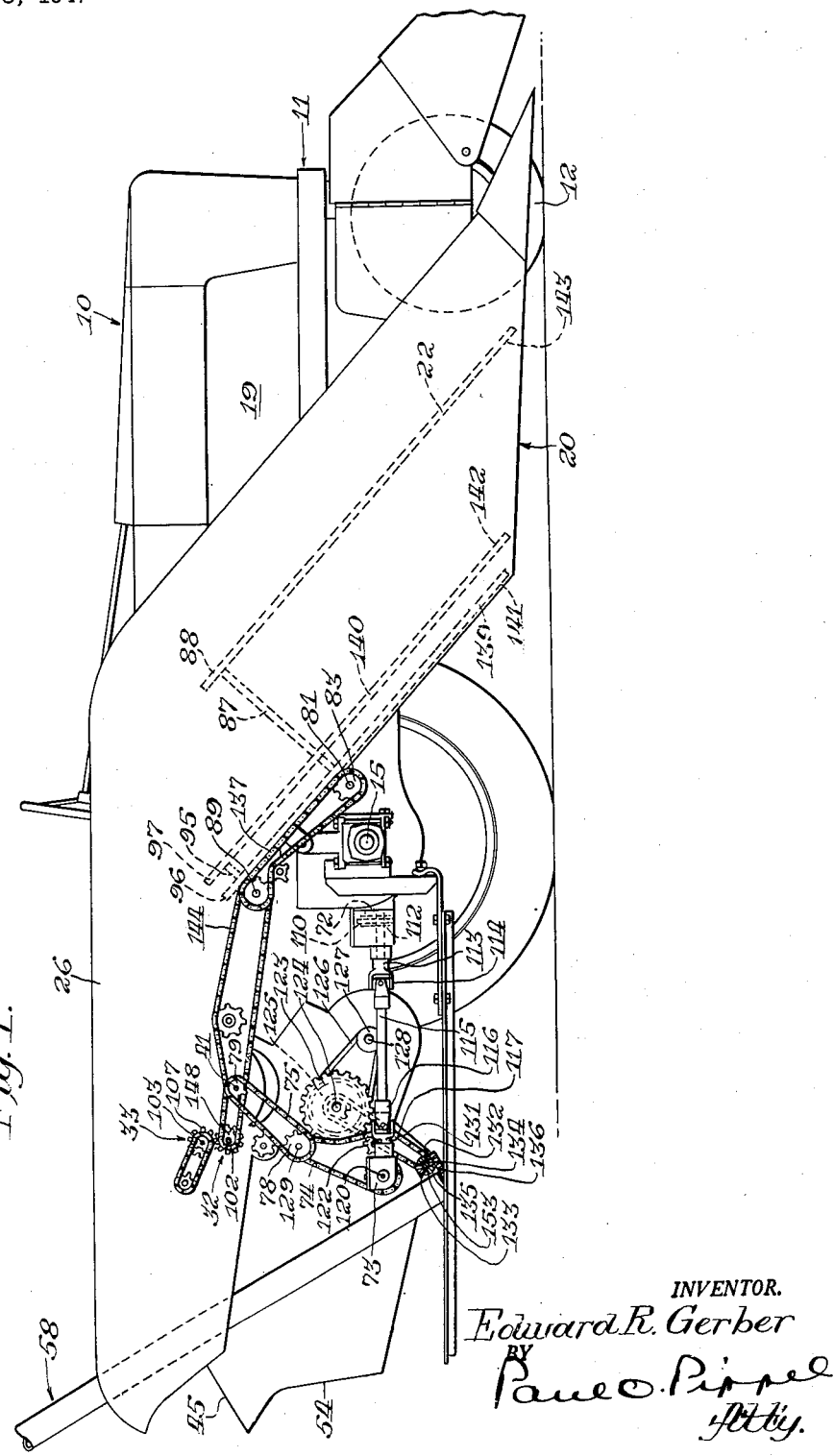
Figure 1 is a side elevational view of the combined tractor-mounted corn picker and sheller of this invention.

As shown in the drawings, the reference numeral 10 indicates generally an agricultural tractor having a relatively narrow longitudinally extending body portion 11 supported at its front end by a pair of closely adjacent steerable wheels 12. The front end of the tractor 10 is further defined as that end of the tractor at the front when the tractor is traveling in a normally forward direction. The rear of the tractor is supported by relatively widely spaced large traction wheels 13 and 14. The wheels 13 and 14 are supported by axles 15 and 16 which are in turn mounted in housings 17 and 18. An engine 19 is mounted on the forward end of the narrow body 11 and imparts drive to the tractor and supplies sufficient power to drive the combination corn picker and sheller carried by the tractor.

The corn picker sheller of this application includes a pair of crop gathering or harvester units 20 and 21 adapted to pick standing corn from the field, and by means of gathering chains 22, 23, 24, and 25 the stalks are carried upwardly and rearwardly through longitudinally extending harvester unit housings 26 and 27. Each of the gathering units 20 and 21 and their respective housings 26 and 27 fit closely adjacent the longitudinally extending body 11 of the tractor and within the confines of the large traction wheels 13 and 14. Sickles 28 and 29 are provided in the throat of each of the gathering units as defined by the gathering chains 22 and 23, and 24 and 25, respectively. The sickles 28 and 29 are adapted to sever the stalk at or near the bottom and thereupon the gathering chains carry the stalks upwardly and rearwardly in such a manner that the butt ends of the stalks are carried upwardly and rearwardly at a faster speed by the chains in order that the stalks may be positioned relatively horizontally with the butt ends extending rearwardly with respect to normal forward travel of the tractor.

Figure 4:
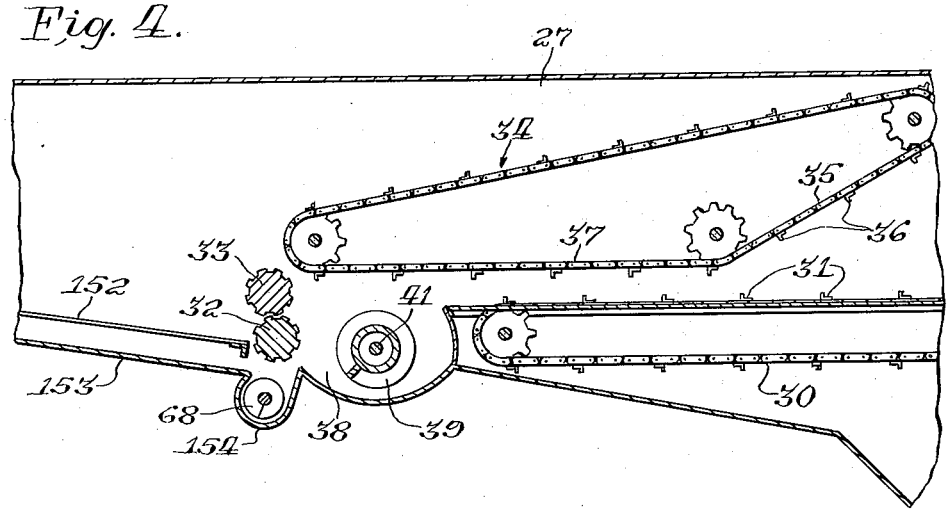
Figure 4 is a sectional view taken on the line 4—4 of Figure 2.

A conveyor 30 having cross plates 31 extends longitudinally of the housing 27 as best shown in Figure 4 and is adapted to carry the stalks rearwardly of the rear tractor axles 15 and 16 so that the butt ends are fed to cooperative snapping rolls 32 and 33 also positioned to the rear of the tractor axles 15 and 16. Another conveyor 34 is positioned above the conveyor 30 in the housing 27, and by reason of an upward and forward end 35 the conveyor flights 36 compress the stalks in the housing 27 down against the conveyor 30 and a horizontal portion 37 of the upper conveyor 34 insures a positive gripping and guiding of the stalks into the snapping rolls 32 and 33. The stalks are carried through the snapping rolls and the ears are broken off in such a manner that they fall downwardly and forwardly from the snapping rolls into the chamber 38 housing an auger conveyor 39.

Figure 3:
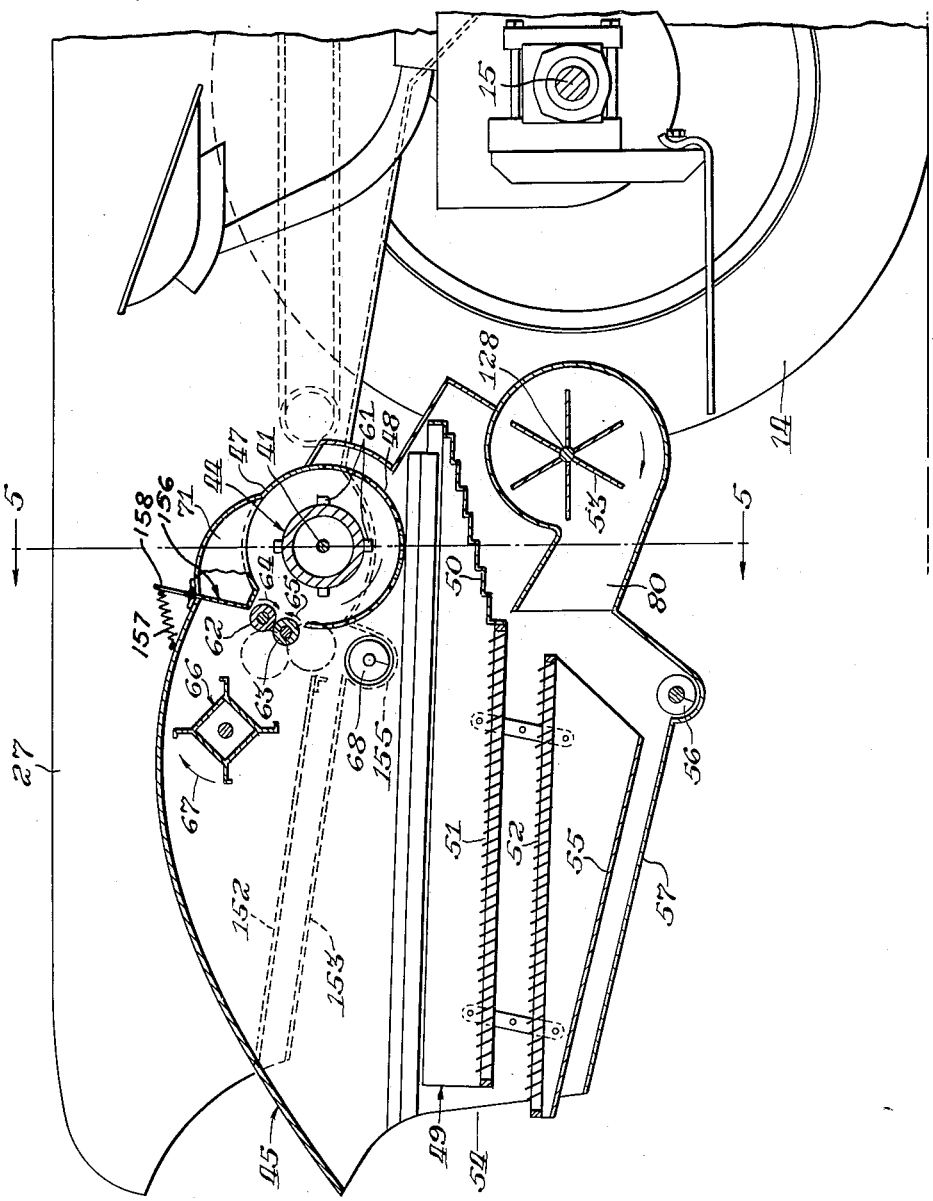
Figure 3 is a sectional view taken on the line 3—3 of Figure 2.
Figure 5:
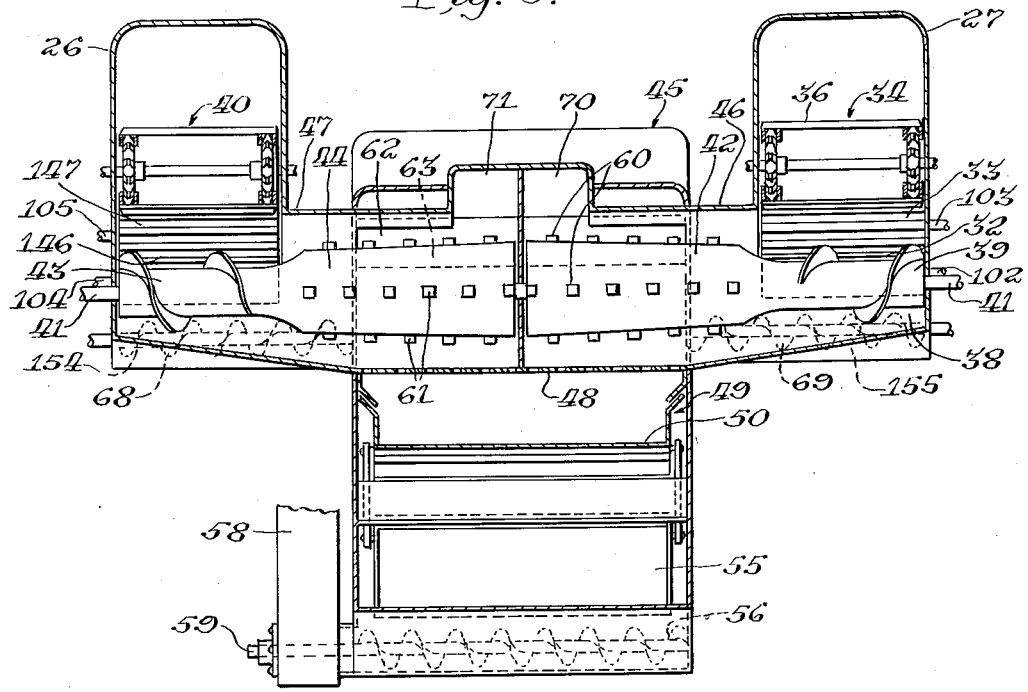
Figure 5 is a sectional view taken on the line 5—5 of Figure 3.

The housing 26 carries similar conveyors, the upper of which is shown in Figure 5 at 40. The auger conveyor 39 is mounted on a transverse shaft 41 extending entirely across the rear of the tractor and through the housing 26 on the opposite side of the machine. A shelling rotor 42 is carried by the shaft adjacent the auger conveyor 39. Corresponding to the auger 39 and shelling rotor 42 are the auger conveyor 43 and the shelling rotor 44 mounted on the shaft 41 at the opposite end thereof. Each of the auger conveyors 39 and 43 is adapted to feed the snapped ears of corn laterally toward the center of the machine. A central transversely extending housing 45 is positioned to the rear of the tractor and between the longitudinally extending housings 26 and 27. The major portions of the shelling rotors 42 and 44 are positioned within this central housing 45. The rotors are positioned within transversely extending cylindrical housings 46 and 47 and confine the ears of corn therewithin while the rotors act to shell the kernels from the cobs. Within the central outer housing 45 the bottom portions of the transverse housings 46 and 47 are equipped with a screen member 48 through which the shelled kernels of corn are adapted to fall. This is best shown in Figures 3 and 5.

The corn drops through the screen 48 onto a shaker tray 49 having a grain pan or stepped end 50 which is adapted to feed the grains of corn to the upper screen or shaker pan 51. The corn drops through the shaker pan to a second lower screened shaker pan 52 which also agitates the grains of corn sufficiently to loosen dirt or other waste, at which time a blast of air from a fan 53 carries away the lighter dirt particles and discharges them through the end opening 54 of the central housing 45. The screened pan 52 is provided with a forwardly and downwardly inclined bottom 55 which feeds the shelled corn forwardly to the auger or worm type conveyor 56. The bottom of the housing 45 is also inclined as shown at 57, and if the grains of corn do get on the bottom, they will flow by gravity to the worm 56. The worm carries the cleaned shelled corn transversely of the housing 45 and delivers the grain to the lower end of a wagon elevator 58 and 59.

As the ears of corn are shelled by the lugs 60 and 61, as shown on the rotors 42 and 44, the removed husks aggregate near the top of the chamber and are removed from this shelling chamber by husk removing rolls 62 and 63 which rotate in a direction indicated by the arrows 64 and 65. A paddle wheel 66 is adapted to pick up the removed husks and by rotating in a clockwise direction as indicated by the arrow 67 in Figure 3, the paddle wheel kicks or otherwise throws the husks rearwardly out the rear opening 54 in the central housing 45. Should the husks fall on the shaker pans, they would merely be walked rearwardly so that they were discharged through the end opening 54.

Auxiliary worm conveyors 68 and 69 are adapted to laterally feed kernels of corn removed during the snapping operation centrally toward the screen 48, at which point the kernels of corn are treated in the same manner as previously described for the corn shelled by the rotors 42 and 44. A grate 152 inclined upwardly and rearwardly from the snapping rolls aids in recovering grain entrained in stalks passing thereover. Grain dropping off onto the grate 152 falls through onto an inclined floor 153 which carries the grain to the spaced aligned augers 68 and 69 which are carried in transversely extending troughs 154 and 155.

The stripped cobs are finally discharged through the arcuate openings 70 and 71 at the top of the shelling chamber and thereupon are delivered along with the husks by the paddle wheel 66 out through the end opening 54 of the central housing 45. A hinged damper or gate 156 controls the cob outlets 70 and 71. A spring 157 is arranged between the housing and an upward extension 158 of the gate to urge the gate to a closed position over the openings 70 and 71. The spring regulated gate thus maintains a back pressure on the discharging cobs to insure efficient shelling. A shelling chamber full of cobs increases the chances of all the kernels being stripped from the cobs. After being discharged the cobs fall onto the shaker pans where any kernels remaining thereon are finally stripped and returned to treatment with the corn that originally fell through the screen 48 from the shelling chambers.

Figure 2:
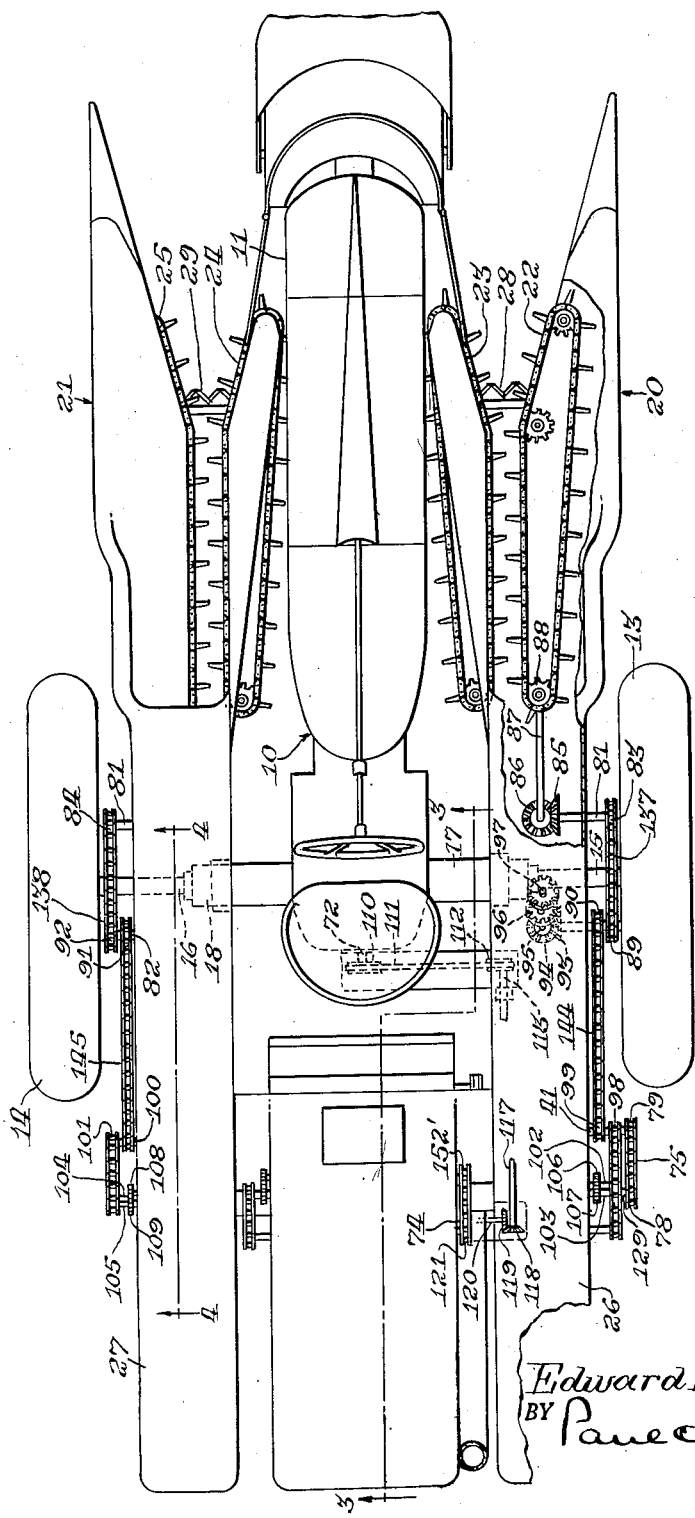
Figure 2 is a top plan view of the device as shown in Figure 1.

The corn picker elements receive their drive from a tractor power take-off shaft 72 which directly drives a V-belt pulley 110 which carries a V-belt 111 to impart drive to a second V-belt pulley 112. The V-belt pulley 112 is keyed or otherwise fastened to a driven shaft 113. The driven shaft 113 is positioned longitudinally of the line of tractor draft and carries rotational drive to a universal joint 114, the other side of which drives a rock shaft 115. The rock shaft 115 extends rearwardly to a second universal joint 116. The rear side of the universal joint 116 is provided with a stub shaft 117 which passes into a gear box 73. As best shown in Figure 2, the gear box 73 houses cooperative bevel gears 118 and 119. The bevel gear 118 is mounted on the longitudinally extending stub shaft 117 and the bevel gear 119 is mounted on a transversely extending shaft 120. A sprocket 121 is mounted on and driven by the shaft 120 at a position outside of the gear box 73. The sprocket 121 carries a chain 74 which extends around an idler sprocket 122 and against a relatively large sprocket 123 for imparting drive thereto. The sprocket 123 is carried on and drives a shaft 124. A V-belt pulley 125 is mounted on the shaft 124 spaced from the sprocket 123. A V-belt 126 extends around the pulley 125 and imparts drive to a V-belt pulley 127 mounted on a fan shaft 128 which as shown in Figure 3 carries the fan 53.

A shaft 81 extends transversely across the tractor mounted corn picker and carries sprockets 83 and 84 at the opposite ends thereof at a position just inwardly of the large rear traction wheels 13 and 14 of the tractor. The shaft 81 also carries a bevel gear 85 which mates with a bevel gear 86 carried and mounted on a shaft 87. The shaft 87 is inclined upwardly and forwardly in a longitudinally extending plane and at its upper end carries a sprocket 88 which drives the outer gathering chain 22. A corresponding driving mechanism is employed for the other outer gathering chain 25. A second cross shaft 82 positioned rearwardly of the cross shaft 81 similarly extends across the entire machine and carries sprockets 89, 90, 91 and 92. The sprockets 89 and 92 are positioned at the extreme opposite ends of the shaft 82 and are in alignment with the sprockets 83 and 84 on the cross shaft 81. Chains 137 and 138 respectively interconnect the sprockets 83 and 89, and 84 and 92. A bevel gear 93 mounted on the shaft 82 imparts drive to a mating bevel gear 94 which is carried on a shaft 95 having sprockets 96 and 97 mounted thereon. These sprockets 96 and 97 respectively drive elevating or lower gathering chains 139 and 140. The lower ends of these chains extend around sprockets 141 and 142. The upper gathering chain 22 has its lower forward end carried on a sprocket 143.

The cross shaft 41 carries sprockets 78, 98, 99, 100, and 101. As previously stated, the shaft 41 has mounted thereon feed augers 39 and 43 and shelling rotors 42 and 44. The sprockets 99 and 100 are in alignment with the sprockets 90 and 91 on the cross shaft 82, and by means of chains 144 and 145 drive is carried between the shafts 41 and 82. The snapping rolls 32 and 33 are mounted on shafts 102 and 103 respectively. Gears 106 and 107 are carried on the shafts 102 and 103 and have meshing engagement with each other whereupon the snapping rolls 32 and 33 rotate in a direction opposite to each other. Similarly, the snapping rolls 146 and 147 on the other side of the machine are mounted on the shafts 104 and 105 and by means of the gears 108 and 109 rotate oppositely. The shafts 102 and 104 carry sprockets 148 and 149. Chains 150 and 151 respectively join sprockets on the shaft 41 with the sprockets 148 and 149, whereby rotational drive is interconnected between the shafts 41 and 102 and 104.

The chain 74 is mounted on a sprocket 152' on the shaft 129. A sprocket 78 also carried on the shaft 129 drives the chain 75 which in turn is carried on the sprocket 79 on shaft 41.

A sprocket 130 mounted on the shaft 124 imparts drive to a chain 131 which imparts drive to a shaft 153 which carries a bevel gear 132. The bevel gear 132 meshes with a complementary bevel gear 133 on the shaft 134. A spur gear 135 is mounted on and is driven by the shaft 134. Gear 135 mates with a spur gear 136 directly driving a conveyor in the wagon elevator 59. It is thus apparent that the mechanisms to be driven all obtain their power from the tractor power take-off shaft. The particular drive, however, is not important to this invention and it should be understood that any suitable driving means may be employed without departing from the spirit of this invention.

In operation, the tractor mounted implement is driven through a field of standing corn, whereupon the stalks are severed by the laterally reciprocating sickles 28 and 29 and the stalks are thence carried upwardly and rearwardly and turned to a horizontal position so that the butt ends are placed rearwardly and are carried by the conveyors 30 and guided in the rearward conveying of the stalks by the conveyors 34 and 40 to the snapping rolls 32 and 33. The stalks are carried through the rolls with the ears being snapped off and permitted to drop into the vicinity of the transversely positioned augers 39 and 43 with each of the augers feeding the ears of corn centrally to the shelling chambers 46 and 47, whereupon the shelling rotors 42 and 44 strip the kernels of corn from the cobs. The shelled corn drops through the semi-circular screen 48 and onto the shaker pans 51 and 52, during which time a blast of air from the fan 53 is directed by the mouth 80 through the shaker pans 51 and 52 carrying any loose dust or trash particles out the end opening 54. The cleaned shelled corn is thereupon recovered by the worm 56, which delivers the kernels to the shaker elevator 58. The husks are removed by the husk removing rolls 62 and 63 and the cobs exit through the central openings 70 and 71 in the top of the shelling chambers.

Many details of construction may be varied throughout a wide range without departing from the principles disclosed herein, and I therefore do not propose limiting the patent granted herein otherwise than as necessitated by the appended claims.

What is claimed is:

1. In a shelling device for tractor mounted corn harvesters in which a harvester unit is positioned at each side of the tractor, and including a sheller unit positioned at each side of the tractor, means feeding shelled corn from each of the sheller units and a single set of screens and shaker mechanisms are provided for receiving grain delivered centrally of the tractor from each of the sheller units.

2. In a corn shelling device for tractor mounted corn harvesters of the type having a substantially longitudinally extending harvester unit positioned at each side of the tractor, a transversely extending housing at the rear of the tractor and joining said spaced harvester units, said harvester units having corn snapping means and conveying means for delivering snapped ears laterally into said transversely extending housing, and comprising individual shelling means in said transversely extending housing adjacent to and adapted to shell the ears of corn harvested and snapped by each of said harvester units, and single cleaning means for corn received from both of said shelling means.

3. A corn sheller device for tractor mounted corn harvesters of the type having a substantially longitudinally extending harvester unit positioned at each side of the tractor, a transversely extending housing at the rear of the tractor and joining said spaced harvester units, said harvester units having corn snapping means and conveying means for delivering snapped ears laterally into said transversely extending housing, and comprising shelling means in said transversely extending housing adjacent each of said harvester units and to each other, single cleaning means for corn received from both of said shelling means, and a common elevator for all of the shelled corn.

4. A shelling device for a tractor mounted corn harvester, a longitudinally extending housing positioned at one side of said tractor, means in said housing for gathering standing corn, corn stalk conveying means in said housing for transporting the corn rearwardly therein, ear snapping means positioned substantially at the rear of said longitudinally extending housing and adapted to receive the stalks from said conveying means, and comprising a corn shelling means positioned laterally of said longitudinally extending housing, and a conveyor between said longitudinally extending housing and said shelling means for delivering snapped ears to said shelling means, said conveyor including an auger on a transversely positioned shaft, said shelling means including a shelling rotor and a cooperative shelling grid, and said shelling rotor mounted on the transversely positioned shaft of the auger.

5. A shelling device for a tractor mounted corn harvester of the type having a longitudinally extending housing positioned at one side of said tractor, means in said housing for gathering standing corn, corn stalk conveying means in said housing for transporting the corn rearwardly therein, ear snapping means positioned substantially at the rear of said longitudinally extending housing and adapted to receive the stalks from said conveying means, and comprising a corn shelling means positioned laterally of said longitudinally extending housing, and a conveyor between said longitudinally extending housing and said shelling means for delivering snapped ears to said shelling means, said conveyor including an auger on a transversely positioned shaft, said shelling means including a shelling rotor and a cooperative shelling grid, and said shelling rotor mounted on the transversely positioned shaft of the auger, shaker pans positioned beneath said shelling grid for separating chaff and dirt from the shelled corn, and a fan arranged and constructed to direct a blast of air over said shaker pan to discharge chaff and dirt.

6. A shelling device for tractor mounted corn harvesters of the type having a longitudinally extending housing positioned at one side of said tractor, means in said housing for gathering standing corn, corn stalk conveying means in said housing for transporting the corn rearwardly therein, ear snapping means positioned substantially at the rear of said longitudinally extending housing and adapted to receive the stalks from said conveying means, and comprising a corn shelling means positioned laterally of said longitudinally extending housing, and a conveyor between said longitudinally extending housing and said shelling means for delivering snapped ears to said shelling means, said conveyor including an auger on a transversely positioned shaft, said shelling means including a shelling rotor and a cooperative shelling grid, and said shelling rotor mounted on the transversely positioned shaft of the auger, shaker pans positioned beneath said shelling grid for separating chaff and dirt from the shelled corn, and a fan arranged and constructed to direct a blast of air over said shaker pan to discharge chaff and dirt, an inclined floor beneath said shaker pans for receiving clean shelled corn and delivering it to one end thereof, and an elevator for elevating the shelled corn to a trailing wagon or the like.

7. A shelling device for tractor mounted corn harvesters of the type having a substantially longitudinally extending harvester unit positioned at each side of the tractor, a transversely extending housing at the rear of the tractor and joining said spaced harvester units, said harvester units having corn snapping means and auger conveying means for delivering snapped ears laterally into said transversely extending housing, and comprising shelling means in said transversely extending housing adjacent each of said harvester units and adjacent to each other, and single cleaning means for corn received from both of said shelling means, each of said shelling means including a shelling rotor, and said auger conveying means and said shelling rotors all mounted on a common transversely extending shaft.

8. A shelling device for a tractor mounted corn harvester of the type having a harvester unit mounted alongside said tractor, stalk gathering and severing means at the forward end of said harvester, means for conveying the severed stalks rearwardly longitudinally of the tractor in a substantially horizontal position, transverse snapping rolls spaced rearwardly from said longitudinal conveying means and rearwardly of the rear axle of the tractor, and comprising a sheller unit mounted on the tractor transversely thereof rearwardly of the rear axle, said unit including a transverse sheller cylinder and hopper leading into said cylinder at its outer end, said hopper being positioned forwardly of and beneath said snapping rolls, a shelling rotor in said cylinder, transverse husk-receiving rolls arranged along the rear side of said cylinder, a perforated grid extending around the lower portion of the cylinder to provide means for removal of grain from the cylinder, a grain-receiving pan beneath said grid, shaker screens positioned rearwardly of said grain pan for removing foreign material from said grain, means for discharging cobs and other extraneous material from the shelling cylinder at the inner end thereof adjacent the central portion of the tractor, said material being delivered to the shakerscreens for removing grain therefrom, a grate extending rearwardly and upwardly from the snapping rolls over which the stalks pass whereby grain entrained thereby falls downwardly through said grate, a floor beneath said grate and inclined rearwardly and upwardly from a position adjacent the snapping rolls, auger conveyor means arranged and constructed to receive grain from said floor and deliver it to the shakers whereby said grain is recovered along with the other grain, a fan positioned on the forward side of said sheller unit, conduit means leading from said fan for delivering a current of air over said shakers, an upwardly and rearwardly extending elevator positioned at the rear of said harvester unit, a transverse auger means for delivering grain transversely toward said elevator, said means for discharging the cobs comprising a spring regulated gate.

EDWARD R. GERBER.

REFERENCES CITED

The following references are of record in the file of this patent:

UNITED STATES PATENTS

| Number | Name | Date |
|---|---|---|
| 1,925,077 | Lindgren et al. | Aug. 29, 1933 |
| 1,968,998 | Elliott | Aug. 7, 1934 |